United States Patent [19]

Nagasaka

[11] Patent Number: 4,705,971

[45] Date of Patent: Nov. 10, 1987

[54] LINEAR RESOLVER

[75] Inventor: Nagahiko Nagasaka, Iruma, Japan

[73] Assignee: Kabushiki Kaisha Yaskawa Denki Seisakusho, Fukuoka, Japan

[21] Appl. No.: 796,552

[22] Filed: Nov. 8, 1985

[30] Foreign Application Priority Data

Feb. 15, 1985 [JP] Japan .................................. 60-27617

[51] Int. Cl.⁴ ............................................ H02K 41/00
[52] U.S. Cl. ..................................... 310/12; 310/111; 336/119; 336/136
[58] Field of Search ..................................... 310/12-15, 310/111, 168; 336/119, 136

[56] References Cited

U.S. PATENT DOCUMENTS

| | | | |
|---|---|---|---|
| 3,030,533 | 4/1962 | Schuqt | 310/111 X |
| 3,136,934 | 6/1964 | Henry-Daudot | 310/156 |
| 3,890,516 | 6/1975 | Widdowson | 310/111 |
| 4,334,207 | 6/1982 | Bill et al. | 310/12 X |
| 4,563,602 | 7/1986 | Nagasaka | 310/12 |

*Primary Examiner*—Donovan F. Duggan
*Attorney, Agent, or Firm*—Ladas & Parry

[57] ABSTRACT

A linear resolver wherein a stator is made of a magnetic material and is toothed at equal pitches along the direction of measurement, and a movable element is an electromagnet made of an E type or C type core around which a primary single phase winding $W_\theta$, is wound, the surface of the movable element facing the stator and constituting part of a magnetic path of the linear resolver being provided with detection secondary windings bonded to the surface, and the detection secondary windings each having as its winding pitch a half the pitch between the teeth of the stator; wherein the movable element is supported relative to the stator with a constant gap therebetween and guided in sliding relation to the stator only in the longitudinal direction of the stator.

4 Claims, 8 Drawing Figures

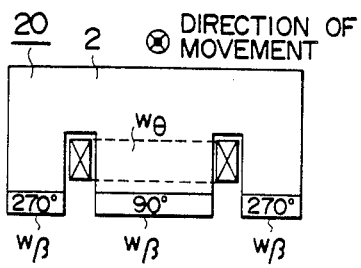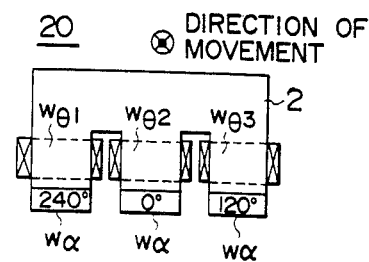
FIG. 2(a)　　　　FIG. 3(a)
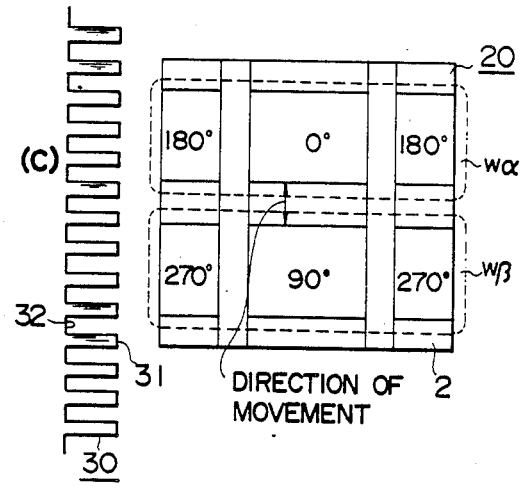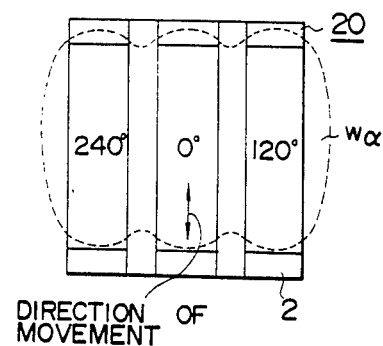
FIG. 2(b)　　　　FIG. 3(b)

LINEAR RESOLVER

BACKGROUND OF THE INVENTION

The present invention relates to a linear type resolver, particularly useful for detecting the position of a pole of a linear DC servo motor to control the switching of exiting current.

Originally, magnetic scales, inductosyns or like apparatus were used for this purpose. However, those apparatus require a complicated transmitter laying down accurately along the stroke of the linear motor.

Furthermore, the prior art apparatus is expensive and difficult to lay the transmitter.

SUMMARY OF THE INVENTION

It is therefore an object of the present invention to eliminate the prior art difficulties and provide a linear resolver which can realize with a single resolver both linear scale and magnetic pole sensor necessary for realizing a brushless linear DC servo motor based upon a linear pulse motor.

According to one aspect of the present invention, there is provided a linear resolver wherein a stator is made of a magnetic material and is toothed at equal pitches along the direction of measurement, and a movable element is an electromagnet made of an E type or C type core around which a primary single phase winding $W_\theta$ is wound, the surface of the movable element facing the stator and constituting part of a magnetic path of the linear resolver being provided with detection secondary windings bonded to the surface, and the detection secondary windings each having as its winding pitch a half the pitch between the teeth of the stator; wherein the movable element is supported relative to the stator with a constant gap therebetween and guided in sliding relation to the stator only in the longitudinal direction of the stator.

BRIEF DESCRIPTION OF THE DRAWINGS

FIG. 2 shows the arrangement of first and second windings of the embodiment;

FIGS. 3(a) and (b) are front and bottom views of a slider according to another embodiment;

DETAILED DESCRIPTION OF THE INVENTION

Figure 1:
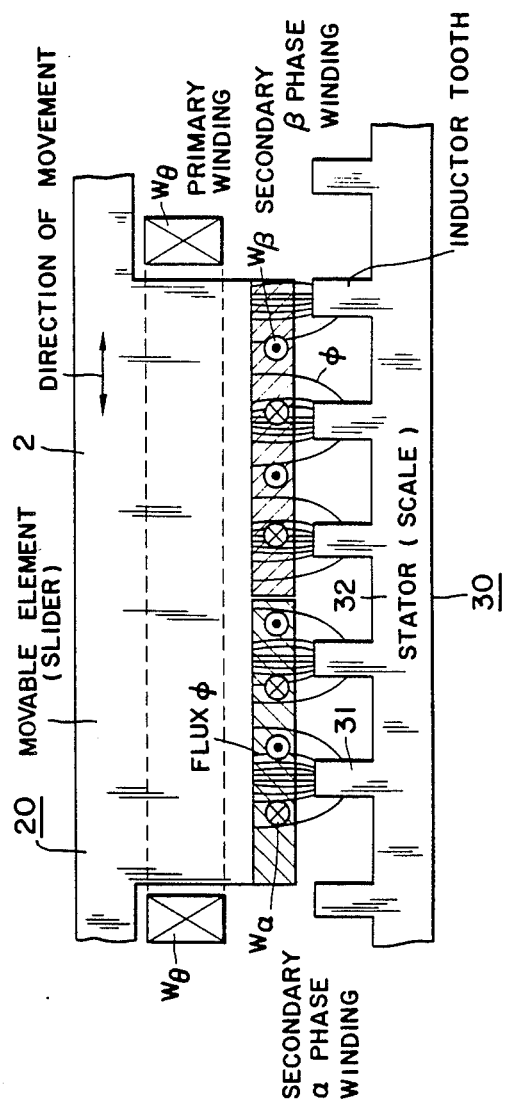
FIG. 1 is a side elevational cross section showing the main portions of a resolver according to an embodiment of the invention.

FIG. 1 is a side elevational cross section showing the main parts of an embodiment of the linear resolver according to the present invention.

A stator (scale) 30 has the same construction of the stator of an inductor type linear motor of the type such as proposed by the present application in Japanese Patent Application No.57-196642. The stator 30 is made of a magnetic material and is toothed at equal pitches along the direction of measurement, wherein teeth 31 and grooves 32 extend in the direction perpendicular to the direction of measurement.

A movable element (slider) 20 is an electromagnet made of an E type or C type core around which a primary single phase winding $W_\theta$ is wound. The slider 20 surface facing the scale 30 and constituting part of a magnetic path of the linear resolver is provided with secondary two phase windings $W_\alpha$ and $W_\beta$ bonded thereto in the form of a printed winding. The secondary windings each have as its winding pitch a half the pitch between the teeth of the stator 30.

The slider 20 is supported relative to the scale 30 with a constant gap therebetween and guided in sliding relation to the scale 30 only in the longitudinal direction of the scale 30.

In the linear resolver constructed as above, magnetic flux generates as shown in FIG. 1 when a single phase AC current flows through the primary winding $W_\theta$.

The secondary winding $W_\alpha$ and $W_\beta$ wound at a half the stator tooth pitch link the magnetic flux $\phi$, and are disposed having 90 degrees electrical angle displacement from each other.

The secondary winding $W\alpha$ and $W\beta$ can be made of a printed conductor like comb teeth used in the slider winding of an Inductsyn.

As the slider 20 moves in the direction of measurement, induced voltages on the secondary windings $W_\alpha$ and $W_\beta$ vary sinusoidally each having a wavelength corresponding to the stator tooth pitch. Since the phase difference between induced voltages of secondary windings $W_\alpha$ and $W_\beta$ is 90 degrees, the function of a resolver is achieved.

FIG. 2 shows a mutual position of windings of a slider which is excited with a single phase powder, wherein FIG. 2(a) is a front view of the slider 20, FIG. 2(b) is a bottom view of the slider 20 showing its surface facing a scale 30, and FIG. 2(c) is a side view of the scale 30.

A primary single phase winding $W_\theta$ is wound around the middle leg of an E type core 2. The secondary winding $W_\alpha$ is composed of serially connected three windings attached to the bottom of the slider 20: one is a winding wound around the middle leg; and the remaining two are windings wound respectively around the right and left legs and having 180 degrees displacement in electrical angle relative to the middle leg winding. Similarly, the secondary single phase winding $W_\beta$ is composed of serially connected three windings: one is a winding wound around a middle leg and having 90 degrees displacement in electrical angle relative to the middle leg of the winding $W_\alpha$; and the remaining two are windings wound respectively around the right and left legs and having 270 degrees displacement in electrical angle relative to the middle leg of the winding $W_\alpha$. All of the secondary windings along the direction of measurement are arranged to have the same mutual angular displacement as described just above.

FIG. 3 shows a mutual position of windings of a slider of another embodiment which is excited with a single phase power, wherein FIG. 3(a) is a front view, and FIG. 3(b) is a bottom view.

In this synchro, phase windings $W_{\theta 1}$, $W_{\theta 2}$ and $W_{\theta 3}$ of the primary three phase windings are wound respectively around each leg of an E type core 2, while a secondary single phase winding $W_\alpha$ is composed of a serially connected three windings: one is a winding wound around the middle leg, and the remaining two are windings wound respectively around the right and left legs and having respectively 120 and 240 degrees displacement in electrical angle relative to the middle leg winding of 0 degree.

This embodiment is suitable for the magnetic pole sensor of a three phase linear brushless DC servo motor. As the secondary winding $W_\alpha$, which is composed of serially connected windings with angular displacement 240, 0 and 120 relative to each other, is energized with a single AC power, three phase signals indicative of magnetic pole positions are induced on the primary winding $W_{\theta 1}$, $W_{\theta 2}$ and $W_{\theta 3}$ of the slider 20. It is noted that this embodiment enables to realize a resolver in which the direction of magnetic flux is perpendicular to the direction of motion of the slider 20.

Figure 4:
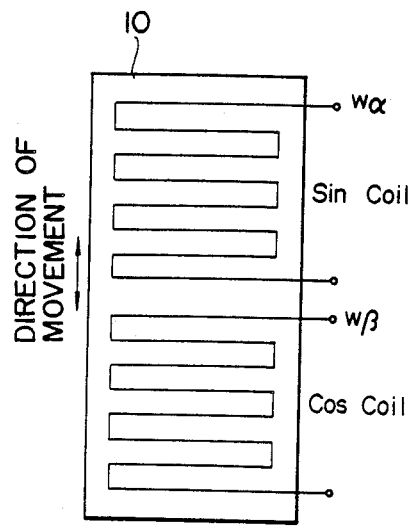
FIGS. 4 and 5 are plan views of secondary two phase windings according to a further embodiment.
Figure 5:
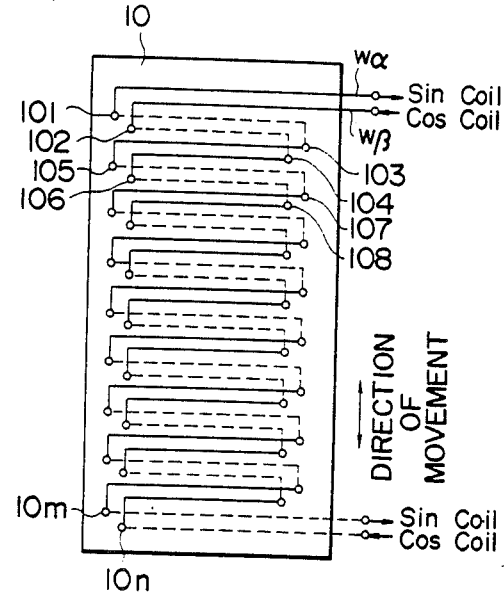
Figure 6:
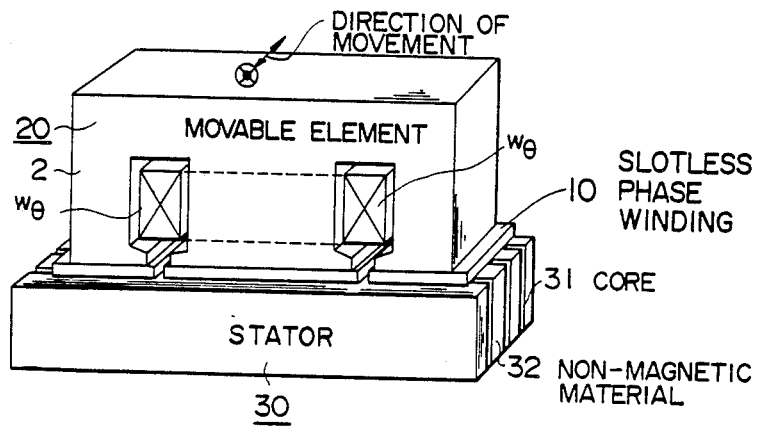
FIG. 6 is a perspective view showing the main parts of a resolver provided with the secondary two phase windings in the form of slotless armature winding.

FIGS. 4 and 5 are plan views of secondary two phase windings arranged in the form of flat winding or slotless armature winding, and FIG. 6 is a perspective view of a resolver provided with such a two phase winding.

In FIG. 4, a sin coil $W_\alpha$ and cos coil $W_\beta$ of toothed and printed coil are separately formed on a printed board 10 (a single layer and separation type).

In FIG. 5, two phase windings $W_\alpha$ and $W_\beta$ are formed on different layers of a printed board having two layers by obtaining electrical connection therebetween through throughholes 101, 102, . . . 10m and 10n (a two-layer and superposition type).

In case that the gap length between the slider 20 and the stator 30 smoothly or unevenly varies with the position along the direction of motion of the slider 20, the two-layer and superposition type windings will compensate for this to accordingly ensure a high precision, as compared with the single layer and separation type windings which have voltage unbalance between the sin and cos coils.

As appreciated from the above description, since the resolver according to the present invention has a similar construction and principle to those of a linear Inductsyn, the same merits can be enjoyed.

In particular, the stator itself of a linear pulse motor can be used as a scale to obviate the necessity of a separate scale of exclusive use; both magnetic pole sensor and linear scale necessary for realizing a brushless linear DC servo motor based upon a linear pulse motor can be realized by a single linear resolver; and also precision can be remarkably improved by using two-layer and superposition type secondary two phase windings in the form of slotless armature winding. Thus, the present invention has wide applications in the field of such technology.

What is claimed is:

1. A linear resolver comprising, a pole equipped in the motor, and primary windings around a pole, and secondary windings set on the surface of a pole, and a stator having a modulated inductor tooth:

said pole equipped in the motor being manouverable longitudinally and consisting of a laminated feromagnetic core formed in a "E" shape, and, said primary windings, wound in single phase and excited by AC current, and, said secondary windings acting as detecting coils, set on the surface of the abovementioned pole, and formed in printed coils or the like, and connected in two phase and disposed at a 90 degree electro-magnetic angle from each other, and, said stator, facing said secondary windings, toothed in equal pitch along its longitudinal direction, and formed at twice the pitch of the secondary winding's pitch.

2. A linear resolver according to claim 1, wherein said primary winding is wound in three phases and said secondary winding is wound in a single phase.

3. A linear resolver according to claim 1, wherein said secondary winding is of a toothed shape and is formed on a single layer of a flat printed insulation board to form a separation type winding.

4. A linear resolver according to claim 1, wherein said secondary winding is of a toothed shape and is formed on opposite two layers of a flat printed insulation board to form a superposition type winding.

* * * * *